(12) United States Patent
Yokokawa et al.

(10) Patent No.: US 6,545,222 B2
(45) Date of Patent: Apr. 8, 2003

(54) CABLE, AND METHOD FOR REMOVING SHEATH AT INTERMEDIATE PART OF CABLE

(75) Inventors: Tomoyuki Yokokawa, Yokohama (JP); Yoshiyuki Suetsugu, Yokohama (JP); Masahiro Eguchi, Yokohama (JP); Kiyotaka Nishioka, Yokohama (JP); Kazuo Hogari, Tsukuba (JP); Hideyuki Iwata, Mito (JP)

(73) Assignees: Sumitomo Electric Industries, Ltd., Osaka (JP); Nippon Telegraph and Telephone Corporation, Tokyo (JP)

( * ) Notice: Subject to any disclaimer, the term of this patent is extended or adjusted under 35 U.S.C. 154(b) by 61 days.

(21) Appl. No.: 09/756,273

(22) Filed: Jan. 9, 2001

(65) Prior Publication Data

US 2001/0043781 A1 Nov. 22, 2001

(30) Foreign Application Priority Data

Jan. 11, 2000 (JP) ........................... 2000-006016

(51) Int. Cl.$^7$ ............................. H01B 7/00; G02B 6/44
(52) U.S. Cl. ..................... 174/110 R; 174/112; 174/41; 385/102
(58) Field of Search ............... 174/36, 110 R, 174/111, 115, 113 R, 40 R, 41, 45 R; 385/113, 114, 109, 136, 102

(56) References Cited

U.S. PATENT DOCUMENTS

| 3,748,371 A | * | 7/1973 | Krook et al. | 174/10 |
| 3,812,282 A | * | 5/1974 | Johansson | 138/121 |
| 4,041,237 A | * | 8/1977 | Stine et al. | 174/10 |
| 4,096,346 A | * | 6/1978 | Stine et al. | 174/110 AR |
| 4,237,337 A | * | 12/1980 | Serrander | 156/51 |
| 5,029,974 A | * | 7/1991 | Nilsson | 385/113 |
| 5,067,830 A | * | 11/1991 | McAlpine et al. | 385/104 |
| 5,173,961 A | * | 12/1992 | Chiasson | 385/112 |
| 5,384,880 A | * | 1/1995 | Keller et al. | 385/100 |
| 5,448,670 A | * | 9/1995 | Blew et al. | 174/70 A |
| 5,719,353 A | * | 2/1998 | Carlson et al. | 174/102 P |
| 5,960,144 A | * | 9/1999 | Klumps et al. | 385/101 |
| 5,970,196 A | * | 10/1999 | Greveling et al. | 385/100 |
| 6,101,305 A | * | 8/2000 | Wagman et al. | 385/113 |
| 6,137,936 A | * | 10/2000 | Fitz et al. | 385/100 |
| 6,236,790 B1 | * | 5/2001 | Okada et al. | 385/100 |
| 6,249,629 B1 | * | 6/2001 | Bringuier | 385/101 |

FOREIGN PATENT DOCUMENTS

| JP | 62-244006 A | * | 10/1987 | ........... G02B/6/44 |
| JP | 5-90737 | | 12/1993 | |
| JP | 8-110449 A | * | 4/1996 | ........... G02B/6/44 |
| JP | 08-110451 | * | 4/1996 | ........... G02B/6/44 |
| JP | 11-174288 A | * | 7/1999 | ........... G02B/6/44 |
| JP | 11-223750 A | * | 8/1999 | ........... G02B/6/44 |
| JP | 2000-338376 A | * | 12/2000 | ........... G02B/6/44 |
| JP | 2001-343571 | * | 12/2001 | ........... G02B/6/44 |

* cited by examiner

Primary Examiner—Dean A. Reichard
Assistant Examiner—William H. Mayo, III
(74) Attorney, Agent, or Firm—McDermott, Will & Emery

(57) ABSTRACT

A cable and a cable stripping method which facilities the stripping of an intermediate part of a cable having a cable core covered by a plastic sheath provided around the outer periphery without damaging the cable core. In a cable having a plastic sheath 2 on a cable core 1, either a groove 2a is provided in the inner surface of the plastic sheath 2 extending in the longitudinal direction of the cable. A ripcord 3 is either fitted in the groove 2a or adhered to the inner surface of the plastic sheath. In either case, the position-indicating means 2b showing the position of the ripcord is provided on the outer surface of the plastic sheath 2 at the point where the ripcord 3 is fitted.

4 Claims, 4 Drawing Sheets

FIG. 3A
FIG. 3B
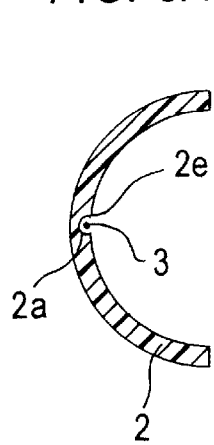
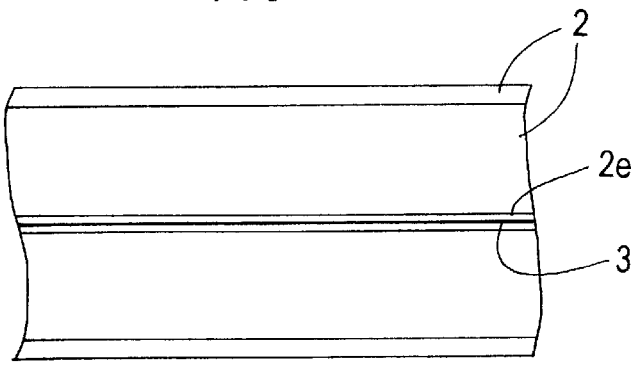
FIG. 4A
FIG. 4B
FIG. 4C
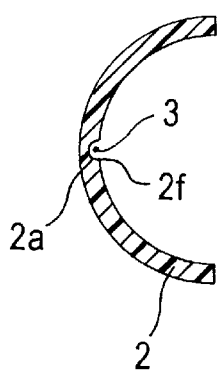
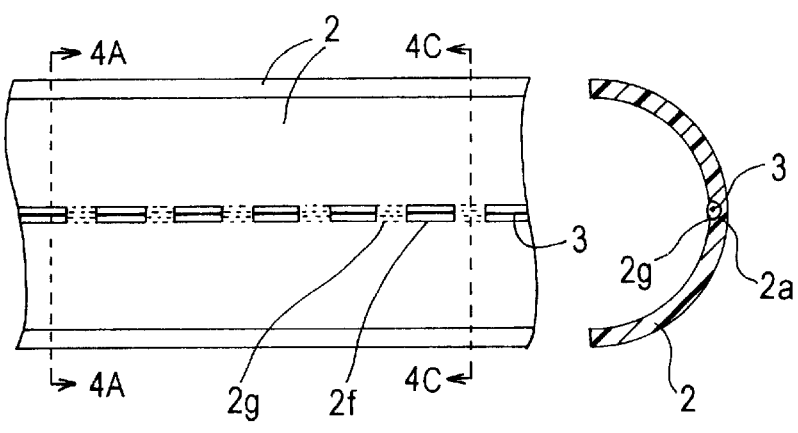
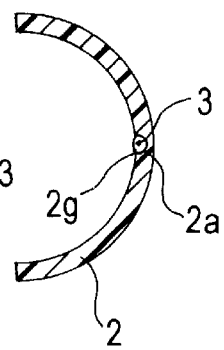
FIG. 5
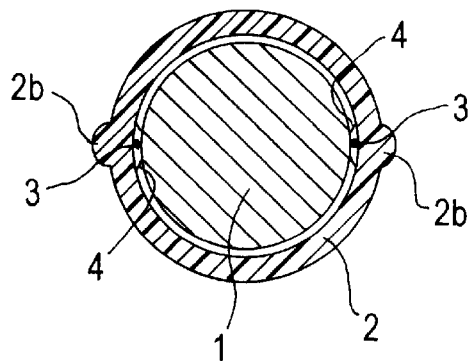

CABLE, AND METHOD FOR REMOVING SHEATH AT INTERMEDIATE PART OF CABLE

BACKGROUND OF THE INVENTION

1. Field of the Invention

This invention relates to a cable with a ripcord, and a method for stripping an intermediate part of the cable.

2. Description of the Related Art

To remove the plastic sheath of a cable having a plastic sheath covering a cable core, first, a circumferential preparatory slit is made in the plastic sheath with a knife or the like at the end of the part to be removed. Then, one or two preparatory slits are made with a knife or the like in the longitudinal direction in the part of plastic sheath to be removed. These preparatory slits are then split open, and the plastic sheath is peeled off.

However, when making preparatory slits in a plastic sheath in the circumferential and longitudinal directions in this manner, great care is needed to avoid damage the cable core inside, and the work requires practice and skill.

Because of this, an alternative special tool for forming circumferential and longitudinal-direction preparatory slits has also been used to avoid damaging the cable core. However, different sizes of cable and different thicknesses and external diameters of sheaths and so on, require numerous different tools to be prepared, and the mechanism of the tool has been complicated.

A method has also been practiced wherein, to facilitate the removal the plastic sheath, a ripcord made, for example, of a tensile fiber is provided inside the plastic sheath in the longitudinal direction of the cable core, and the plastic sheath is removed using this ripcord.

In this method, the plastic sheath is split open in the longitudinal direction by pulling alongside the cable, an end of the ripcord extracted from an end of the cable back, and this split part of the plastic sheath is then cut off.

Thus, in this cable with a ripcord at an end, it is possible to strip off the plastic sheath easily, because an end of the ripcord can be extracted easily.

However, it is not easy to extract an end of the ripcord, at an intermediate part of the cable. This is because the location of the ripcord is not visible from the surface of the plastic sheath.

To extract the ripcord at an intermediate part of the cable, it is necessary to make a circumferential preparatory slit in the plastic sheath with a knife or the like and then locate and extract the ripcord.

Thus this case which also requires the operation of making a circumferential preparatory slit in the plastic sheath, requires great care and skill as well so as not to damage the cable core.

SUMMARY OF THE INVENTION

It is therefore an object of the present invention to provide a cable and a stripping method with which the cable can be stripped easily without damaging the cable core even at an intermediate part of the cable.

The cable of this invention is a cable having a plastic sheath provided on a cable core; a groove extending in the longitudinal direction of the cable is formed in the inner surface of the plastic sheath, a ripcord is fitted in the groove, and a position-indicating means showing the position of the ripcord is provided on the outer surface of the plastic sheath in which the ripcord is fitted.

Alternatively, instead of providing the groove in the inner surface of the plastic sheath and inserting the ripcord into the groove, the ripcord can be fixed to the inner surface of the plastic sheath by direct adhesion and then a position-indicating means showing the position of the ripcord can be provided on the outer surface of the plastic sheath at the point where the ripcord is adhered.

A cable having a ripcord according to the invention can also be a self-supporting cable.

In a self-supporting cable, the cable is comprised of a supporting wire and a cable core, each covered with a plastic sheath, and the plastic sheath covering the supporting wire and the plastic sheath covering the cable core are connected to each other by plastic neck parts located intermittently in the longitudinal direction of the cable; also, on the side of the cable core plastic sheath nearest the supporting wire and the farthest side thereof from the supporting wire, a tensile member extending in the longitudinal direction is embedded in the sheath resin, respectively.

As a method of applying the invention to this kind of self-supporting cable, for example, in two locations of the plastic sheath, each 90° apart in the circumferential direction from the positions where the tensile members are embedded, either grooves extending in the longitudinal direction of the cable are provided in the inner surface of the plastic sheath and ripcords are fitted in the grooves, or ripcords are directly adhered to the inner surface of the plastic sheath, and a position-indicating means showing the positions of the ripcords are provided on the outer surface of the plastic sheath at the points where the ripcords are fitted or adhered.

When this is done, the operation of stripping an intermediate part of the self-supporting cable, facilitate the removal of the plastic sheath without damaging the cable core. And of course, the fundamental characteristics of the self-supporting cable are maintained. That is, because this self-supporting cable can tolerate wind pressures when used as an aerial cable, and also the cable core can be made to have surplus length, excessive tension does not act undesirably on the cable core and the cable is suitable as an optical fiber cable for subscriber line use.

In the case of the cable having on the outer surface of the plastic sheath a position-indicating means showing the position of the ripcords as described above, after the cable is installed, by cutting a part of the plastic sheath with a knife or the like at any intermediate position on the cable using the position-indicating means as a guide and then pulling the ripcords in the direction in which the plastic sheath is to be split, the plastic sheath can be split in the longitudinal direction of the cable, and this split part can then be cut off to expose the cable core. By means of this procedure even an intermediate part of the cable can be stripped easily, and thus simplifies intermediate branching work.

BRIEF DESCRIPTION OF THE DRAWINGS

FIG. 3A is a sectional view and FIG. 3B a side view showing an example of a plastic sheath having a groove with a continuous opening;

FIG. 4A is a sectional view on the line X—X, FIG. 4B a side view and FIG. 4C a sectional view on the line Y—Y showing an example of a plastic sheath having a groove with a non-continuous opening;

FIG. 5 is a sectional view showing another preferred embodiment of a cable according to the invention.

DETAILED DESCRIPTION OF THE PREFERRED EMBODIMENTS

Preferred embodiments of the invention will now be described in detail, using the accompanying drawings.

Figure 1A:
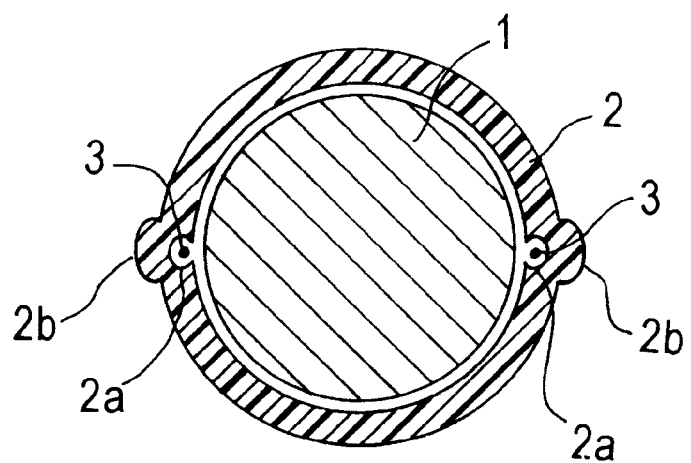
FIG. 1A is a sectional view and FIG. 1B a perspective view of a preferred embodiment of a cable according to the invention.
Figure 1B:
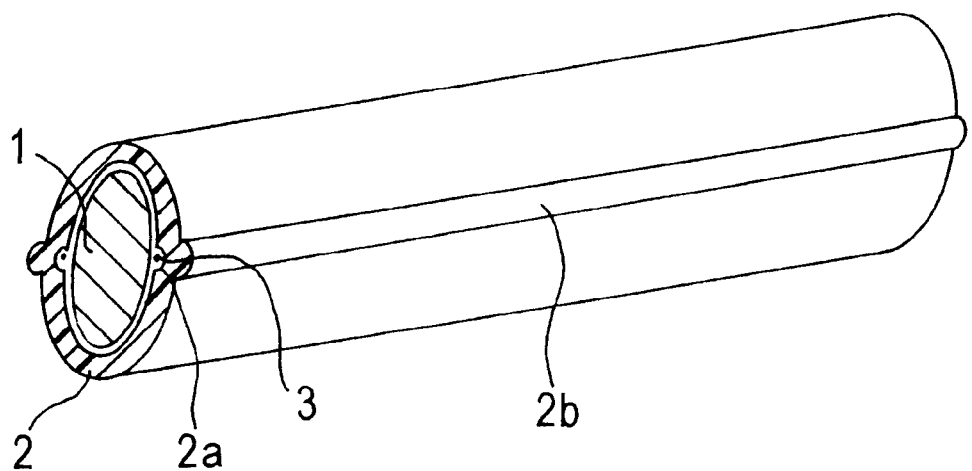

FIG. 1A is a sectional view and FIG. 1B a perspective view of a preferred embodiment of a cable according to the invention. In these figures, the reference numeral 1 denotes a cable core; 2 a plastic sheath; 2a a groove; 2b a position-indicator; and 3 a ripcord.

The cable core 1 is a cluster core made up of, for example, an optical fiber core, an insulated electric wire for communication use, an insulated electric wire for power use, and an insulated electric wire for control use, and the types of wires included in it are not particularly limited. The plastic sheath 2 is provided as a substantially circular tubular molding of thickness 1.3 mm to 2.0 mm on the outside of the cable core 1 by extrusion molding a plastic such as polyethylene or polyvinyl chloride resin.

The grooves 2a extend in the longitudinal direction of the cable in the inner surface of the plastic sheath 2, and the ripcords 3, each of which consists of an aramid fiber cord, a polyester fiber cord or a metal wire or the like, are fitted inside the grooves 2a. The grooves 2a in FIGS. 1A and 1B are hollows substantially circular in cross-section and having a part in the circumferential direction open, and their internal diameter is about 0.08 mm to 1.0 mm. The ripcords 3 fitted in the grooves 2a are preferably fiber cords of 2000 decitex to 5000 decitex. By using this kind of ripcord it is possible to split the plastic sheath 2 open in the longitudinal direction.

It is not necessary for the ripcords 3 to fit in the grooves 2a completely, and part of each of the ripcords 3 may project through the opening in the groove 2a. However, it is undesirable for the whole ripcord to slip out of the groove, because the position of the ripcord is then uncertain.

As a preventative method against the whole ripcord slipping out of the groove, the width of the opening may be made narrower than the thickness of the ripcord.

Position-indicating means 2b is provided on the outer surface of the plastic sheath 2 in the position where the ripcord 3 is fitted.

The grooves 2a and the position-indicators 2b can be formed for example by designing a nipple and a die used in extrusion-molding the plastic sheath to match their shapes. The ripcords 3 can be supplied in parallel with the cable core 1 and fitted in the grooves 2a simultaneously with the extrusion molding of the plastic sheath 2.

If the position-indicating means 2b is made in the form of a projecting tongue extending along the surface of the plastic sheath in the longitudinal direction as shown in the example of FIGS. 1A and 1B, the position at which the ripcord is fitted in the plastic sheath in the circumferential direction can be known at any position in the longitudinal direction of the cable.

Figure 2A:
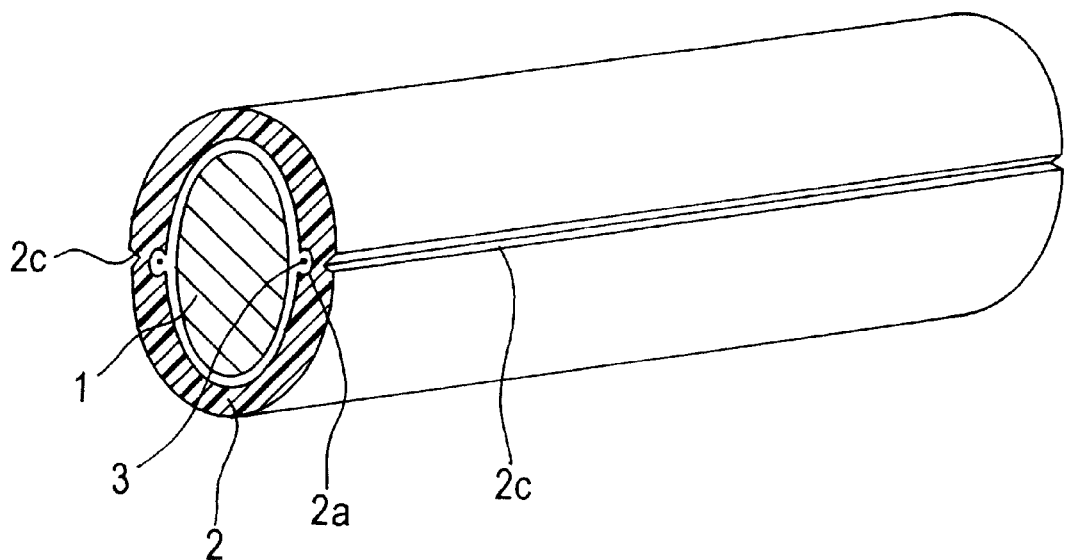
FIGS. 2A and 2B are perspective views showing other examples of position-indicators of cables according to the invention.
Figure 2B:
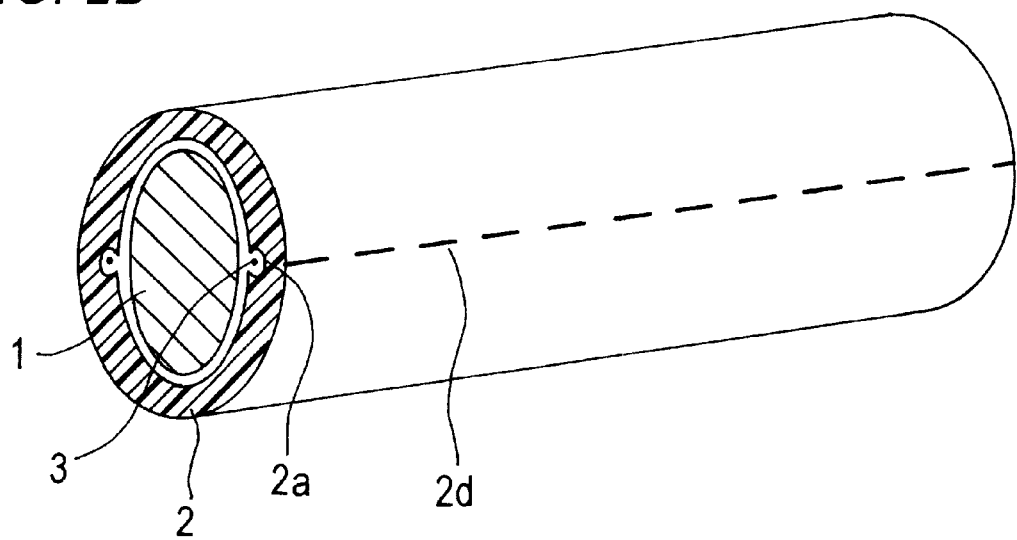

FIGS. 2A and 2B are perspective views showing other examples of position-indicating means: FIG. 2A shows an example wherein position-indicating means 2c is formed as a longitudinal notch, and FIG. 2B an example wherein position-indicating means 2d is formed as a line of dashes.

Because the position-indicating means provided on the outer surface of the plastic sheath need only show the position of the ripcord inside, provided that it extends in the longitudinal direction along the outer surface of the plastic sheath at the point where the ripcord is positioned and can be seen, it is not of particular significant whether the position-indicating means is a printed means or is a convexity or a concavity.

And although FIGS. 1A and 1B and FIGS. 2A and 2B show cases wherein there are two each of the grooves 2a, the ripcords 3 and the position indicators 2b, 2c and 2d, there may alternatively be one or three or more.

If two ripcords are fitted in positions 180° apart in the circumferential direction of the plastic sheath, even in the case of a relatively hard plastic sheath the cable core can be extracted from inside the plastic sheath easily, because the plastic sheath can be divided almost equally into two parts with the ripcords.

FIGS. 3A and 3B and FIGS. 4A through 4C are views showing other examples of forms of the groove. FIGS. 3A and 3B respectively are a sectional view and a side view of a plastic sheath having a groove with a continuous opening, and FIGS. 4A, 4B and 4C respectively are a sectional view on the line X—X, a side view and a sectional view on the line Y—Y of a plastic sheath having a groove with a non-continuous opening. In the figures, the reference numerals 2e and 2f denote openings and 2g a closure.

In the example shown in FIGS. 3A and 3B, the opening 2e of the groove 2a is open continuously in the longitudinal direction. In the example of FIGS. 4A through 4C, on the other hand, the opening 2f of the groove 2a is non-continuous in the longitudinal direction and openings 2f and closures 2g are formed alternately in the longitudinal direction in the form of a tear line. The openings 2f and the closures 2g do not need to be the same length, and nor do their respective lengths need to be fixed in the longitudinal direction.

Since the ripcord 3 is fitted inside the groove 2a and the cable core 1 is present inside the plastic sheath 2, normally the ripcord 3 does not slip out from the groove 2a. However, when the cable undergoes bending, for example when being installed, it is conceivable for the ripcord 3 to slip out from the groove 2a and fall into a gap between the cable core 1 and the plastic sheath 2. With respect to this, when the opening of the groove 2a is non-continuous and closures 2g are formed across it, the closures 2g perform the function of a lid and there is no risk of the ripcord 3 slipping out of the groove 2a.

Also, when grooves 2a and ripcords are disposed in two locations in the cross-section of the plastic sheath, when the plastic sheath 2 is split open with the ripcords 3 in the example shown in FIGS. 3A and 3B, the plastic sheath 2 is divided completely into two parts, and the cable core inside slips out from the plastic sheath 2. At this time, care must be taken to prevent the occurrence of accidents wherein the cable core having slipped out catches on another member for connection use or the like and is damaged.

In the example of FIGS. 4A through 4D, on the other hand, even when the plastic sheath 2 has been split open with the ripcords 3, because the plastic sheath 2 is not completely divided into two parts and is still held together by the sheath resin forming the closures 2g, the cable core does not spontaneously slip out. And because the resin thickness of the closures 2g is extremely thin and the plastic sheath 2 can be easily divided into two by being pulled, by gradually dividing the plastic sheath 2 at the closures 2g progressively in the longitudinal direction it is possible to extract the cable core from inside the plastic sheath smoothly.

The non-continuous opening structure of the groove 2a shown in FIGS. 4A through 4D can for example be manufactured by intermittently opening and closing a resin flow passage between a nipple and a die used to extrude the plastic sheath.

FIG. 5 is a sectional view showing another preferred embodiment of a cable according to the invention. In this cable no equivalent of the grooves of the cable shown in FIGS. 1A and 1B is provided, and instead the ripcords 3 are fixed with an adhesive 4. Position-indicating means 2b provided on the outer surface of the plastic sheath 2 is the same as that in FIGS. 1A and 1B.

The fixing of the ripcords 3 to the inner surface of the plastic sheath 2 by means of the adhesive 4 can be carried out for example by supplying ripcords coated with the adhesive at the time of extrusion of the plastic sheath 2 and pressing them against the inner surface of the plastic sheath.

Figure 6A:
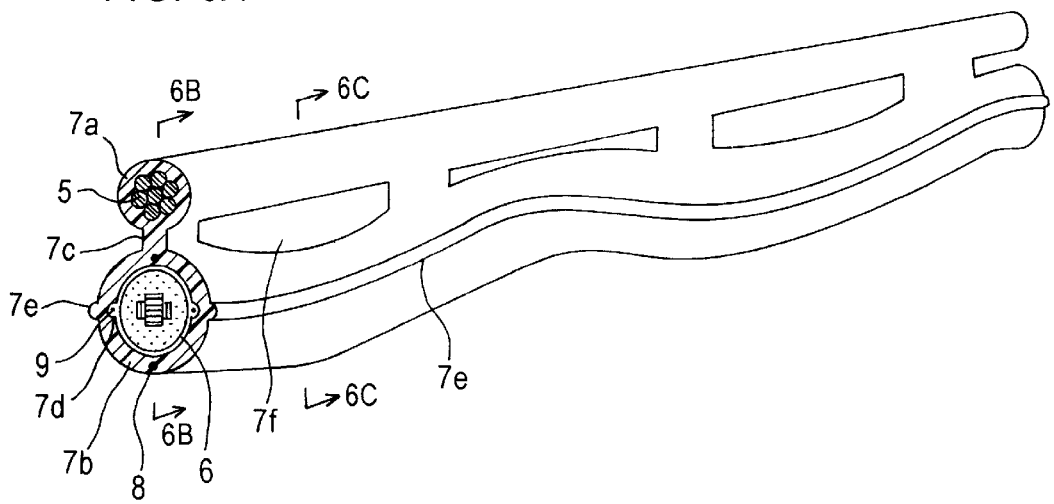
FIG. 6A is a perspective view, FIG. 6B a sectional view on the line X—X and FIG. 6C a sectional view on the line Y—Y showing an example of the invention applied to a self-supporting cable for optical fiber use.
Figure 6B:
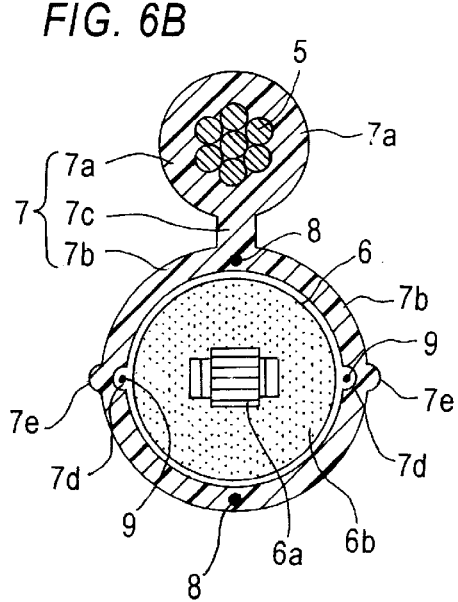
Figure 6C:
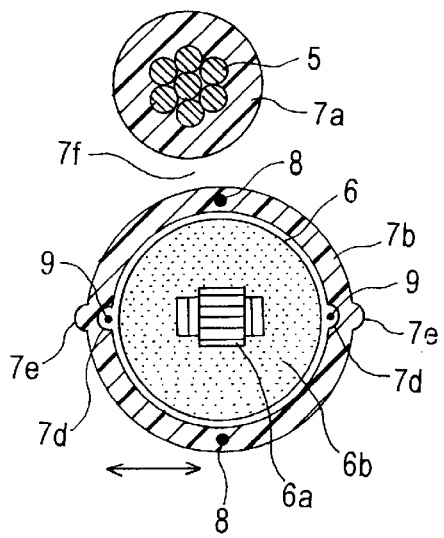

FIG. 6A is a perspective view on the line X—X, FIG. 6B a sectional view and FIG. 6C a sectional view on the line Y—Y showing an example of the invention applied to a self-supporting cable for optical fiber use. In these figures, the reference numeral 5 denotes a supporting wire; 6 a cable core; 6a an optical fiber ribbon; 6b a protective fiber cord; 7 a plastic sheath; 7a a supporting wire side plastic sheath; 7b a cable core side plastic sheath; 7c a neck part; 7d a groove; 7e position-indicating means; 7f a window; 8 a tensile member; and 9 a ripcord.

The cable core 6 of this cable in FIGS. 6A through 6C, consists of multiple optical fiber ribbons 6a stacked and protected by a protective fiber cord 6b such as a polypropylene cord, and this cable core is covered by the cable core side plastic sheath 7b; however, the cable core 6 may alternatively be a cluster of insulated electric wires for communication use or the like.

In the cable core 6 of FIGS. 6A through 6C, to make the side have extra length with respect to the supporting wire 5 side, the cable core 6 side is connected to the supporting wire 5 side by neck parts 7c intermittently in the longitudinal direction in a snaking state. The parts between the neck parts 7c constitute windows 7f in the longitudinal direction and perform the function of alleviating stresses caused by wind pressure and the like when the cable is installed aerially. The supporting wire 5 is made for example from zinc-plated steel stranded wire of fiber reinforced plastic (FRP) or the like.

And, in the cable shown in FIGS. 6A through 6C, in a location on the side of the cable core side plastic sheath 7b nearest to the supporting wire and another location on the side farthest from the plastic sheath, tension members 8 consisting of steel wires or the like are embedded in the sheath resin, extending in the longitudinal direction. These tension members 8 hold the cable core side plastic sheath 7b to prevent it from contracting in the longitudinal direction, and fulfil the role of holding the extra length of the cable core at a predetermined value.

And, in this cable, in two locations 90° away from the tension members 8 in the circumferential direction of the cable core side plastic sheath 7b, grooves 7d are provided in the inner surface of the cable core side plastic sheath 7b, and the ripcords 9 are fitted in these grooves 7d.

These grooves 7d have openings and closures of the kind shown in FIGS. 4A through 4C so that the ripcords 9 do not slip out of the grooves 7d.

Also, position-indicating means 7e showing the positions of the ripcords are provided on the outer surface of the plastic sheath 7b at the points where the ripcords 9 are disposed.

The position-indicating means shown in FIGS. 2A and 2B can alternatively be employed.

It is also possible for the ripcords 9 to be fixed to the inner surface of the plastic sheath 7b with adhesive, instead of the grooves being formed and the ripcords being fitted in the grooves.

In all of the cables described above with reference to FIGS. 1A through 6C, a ripcord is disposed in a predetermined position extending in the longitudinal direction along the inner surface of a plastic sheath provided on a cable core, and a position-indicating means showing the position of the ripcord is provided on the outer surface of the plastic sheath in the position where the ripcord is disposed.

Therefore, at any position on an intermediate part of the cable, by shaving the plastic sheath with a knife or the like with the position-indicating means as a guide, the ripcord can be exposed and easily pulled out without damaging the cable core.

By pulling in a direction in which the plastic sheath is to be split the ripcord that has been pulled out through the shaved part of the plastic sheath, it is possible to split the plastic sheath in the longitudinal direction. If one or two splits can be formed in the plastic sheath, the cable core can be extracted through them. And the part of the plastic sheath from which the cable core has been removed can be cut off without risk of damaging the cable core. In this way, it is possible to remove the plastic sheath easily and expose the cable core for intermediate branching or the like at any position on the intermediate part of the cable in the longitudinal direction.

When a ripcord made of a tensile fiber bundle is pulled out through a shaved part of the plastic sheath, it may result in only a part of the fiber bundle being pulled out as opposed to the entire fiber bundle. To avoid this, if the tensile fiber bundle of the ripcord is provided with a coating of, for example, a resin hardened by ultraviolet light, when the ripcord is pulled out the entire ripcord can be pulled out without any of the fiber bundle remaining inside the plastic sheath.

As described above, because a cable according to this invention has a groove in the inner surface of a plastic sheath provided on a cable core and a ripcord is fitted in this groove and a position-indicating means is provided on the outer surface of the plastic sheath in a position corresponding to that in which the ripcord is fitted, even at an intermediate part of the cable, by shaving off a portion of the plastic sheath with a knife or the like using the position-indicating means as a guide, it is possible to pull out the ripcord without damaging the cable core. By pulling the ripcord in the direction in which the plastic sheath is to be split and thereby splitting the plastic sheath and then extracting the cable core from inside the plastic sheath and then cutting off such part of the plastic sheath, it is possible to strip the cable without damaging the cable core.

And also if the position of the ripcord is fixed by directly adhering the ripcord to the inner surface of the plastic sheath, instead of forming a groove in the inner surface of the plastic sheath and fitting the ripcord therein, the operation of stripping an intermediate part of the cable can be carried out in the same way. And because the ripcord fixed with adhesive does not slip in the longitudinal direction, even when an intermediate part of the cable to be stripped is near an end of the cable and thus near an end of the ripcord, when the ripcord is pulled to split the plastic sheath, the plastic sheath can still be split with the ripcord, because the ripcord does not slip in the longitudinal direction.

The method provided by the present invention of disposing a ripcord in a predetermined position inside a plastic sheath and providing a position-indicating means on the outer surface of the plastic sheath can also be applied to a self-supporting cable, wherein a supporting wire and a cable core are each covered with a plastic sheath and the plastic sheath of the supporting wire side and the plastic sheath of the cable core side are connected to each other intermittently in the longitudinal direction of the cable by plastic constituting neck parts.

What is claimed is:

1. A cable having a plastic sheath provided around the outer periphery of a cable core, wherein:

a groove is provided extending in the cable longitudinal direction in the inner surface of the plastic sheath and a ripcord is fitted in the groove; and a position-indicating means showing the position of the ripcord is provided on the outer surface of the plastic sheath at the point where the ripcord is fitted, wherein an opening of the groove is non-continuous in the longitudinal direction of the cable.

2. A cable according to claim 1, wherein the ripcord is a tensile fiber coated with a layer of resin.

3. A cable having a supporting wire and a cable core each covered with a plastic sheath, the plastic sheaths of the supporting wire and the cable core being connected intermittently in the longitudinal direction of the cable by plastic constituting neck parts, wherein tension members are embedded in the longitudinal direction in a sheath resin of the side of the plastic sheath covering the cable core nearest the supporting wire and of the side farthest from the supporting wire; wherein grooves are provided extending in the cable longitudinal direction in the inner surface of the plastic sheath in two locations set apart by a predetermined angle in the circumferential direction from the positions of the tension members in such a plastic sheath ripcords are fitted in the grooves; and a position-indicating means showing the positions of the ripcords are provided on the outer surface of the plastic sheath at the point where the ripcords are fitted, wherein an opening of each of the grooves is non-continuous in the longitudinal direction of the cable.

4. A cable according to claim 3, wherein each of the ripcords is a tensile fiber bundle coated with a layer of resin.

* * * * *

UNITED STATES PATENT AND TRADEMARK OFFICE
CERTIFICATE OF CORRECTION

PATENT NO.      : 6,545,222 B2
DATED           : April 8, 2003
INVENTOR(S)     : Tomoyuki Yokokawa et al.

It is certified that error appears in the above-identified patent and that said Letters Patent is hereby corrected as shown below:

<u>Column 8,</u>
Line 17, change "in such a plastic sheath ripcords are fitted" to -- in such a plastic sheath and ripcords are fitted --.

Signed and Sealed this

Sixteenth Day of September, 2003

JAMES E. ROGAN
*Director of the United States Patent and Trademark Office*